(12) United States Patent
Kouketsu et al.

(10) Patent No.: US 6,289,737 B1
(45) Date of Patent: Sep. 18, 2001

(54) VACUUM PRESSURE CONTROL SYSTEM

(75) Inventors: Masayuki Kouketsu; Masayuki Watanabe, both of Tokyo; Hiroshi Kagohashi, Kasugai, all of (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 09/449,979

(22) Filed: Nov. 26, 1999

(30) Foreign Application Priority Data

Nov. 27, 1998 (JP) .................................................. 10-337543

(51) Int. Cl.[7] ........................................................ G01L 7/00
(52) U.S. Cl. .............................................................. 73/714
(58) Field of Search ...................... 73/714, 426; 137/271, 137/487.5, 488, 492.5; 251/121, 63, 63.5, 26, 62, 63.6

(56) References Cited

U.S. PATENT DOCUMENTS 5,470,117 * 11/1995 Schmidt .................................. 294/907
6,041,814 * 3/2000 Kouketsu et al. .................... 137/492.5
6,202,681 * 3/2001 Kouketsu et al. .................... 137/492.5

FOREIGN PATENT DOCUMENTS 9-72458   3/1997 (JP) .

* cited by examiner

Primary Examiner—William Oen
(74) Attorney, Agent, or Firm—Finnegan, Henderson, Farabow, Garrett & Dunner, L.L.P.

(57) ABSTRACT

In a vacuum pressure control system, the vacuum pressure in a reaction chamber 10 is measured by vacuum pressure sensors 14 and 15 (S22), the measured value is changed at a set vacuum pressure changing speed commanded from the exterior or determined and stored in advance in a controller of the system (S24). The changed value is sequentially generated as an internal command. In response to the sequentially generated internal commands, a desired value of the feedback control is changed in sequence (S26), so that the feedback control is executed as follow-up control (S27). Accordingly, the vacuum pressure in the reaction chamber 10 can be uniformly changed to a desired vacuum at a set vacuum pressure changing speed.

8 Claims, 13 Drawing Sheets

VACUUM PRESSURE CONTROL SYSTEM

BACKGROUND OF THE INVENTION

1. Field of the Invention

The present invention relates to a vacuum pressure control system for use in a semiconductor manufacturing apparatus or line.

2. Description of Related Art

In a CVD system in a semiconductor manufacturing apparatus or line, for instance, material gas which consists of elements which constitute a thin film material is supplied on wafers placed in a reaction chamber, while the inside of the reaction chamber is maintained under decompression, or vacuum. For example, in a CVD system shown in FIG. 14, the material gas is supplied on the wafers placed in the reaction chamber 111 which is a vacuum vessel through an inlet port 111 thereof. Simultaneously, the gas in the reaction chamber 110 is exhausted through an outlet port 112 of the reaction chamber 111 by suction of a vacuum pump 113. Thus, the inside of the reaction chamber 110 is maintained under vacuum.

At this time, it is necessary to maintain the vacuum pressure in there action chamber 110 constant. However, the constant value varies over a wide range of pressure from atmospheric pressure or a low vacuum near atmospheric pressure to a high vacuum according to various conditions. Then, in Japanese Patent No. 2,677,536, applicant of the present invention has disclosed a vacuum pressure control system capable of providing a constant vacuum over a wide range from a low vacuum near atmospheric pressure to a high vacuum.

FIG. 14 shows an example of the vacuum pressure control system. In such the vacuum pressure control system, the vacuum pressure in the reaction chamber 110 is measured by vacuum pressure sensors 114 and 115. In response to a difference between the measured pressure value and a desired vacuum pressure value given from the exterior, the control system controls the opening degree of a vacuum proportional opening and closing valve 116 provided with a poppet valve configuration.

The control system changes the conductance of an exhaust system from the reaction chamber 110 to the vacuum pump 113 in accordance with the opening degree of the opening and closing valve 116, and executes feedback-control on the vacuum pressure in the reaction chamber 110.

Thus, the control of the opening degree of the vacuum proportional valve 116 makes it possible to widely and surely change the conductance of the exhaust system. Accordingly, the vacuum pressure in the reaction chamber 110 can be maintained constant at a desired vacuum pressure value over a wide range from atmospheric pressure or a low vacuum near atmospheric pressure to a high vacuum.

In the conventional vacuum pressure control system, as mentioned above, the vacuum pressure sensors 114 and 115 measure the vacuum pressure in the reaction chamber 110, and the opening of the valve 116 is controlled in response to the difference between the measured vacuum pressure value and the desired vacuum pressure value, thereby changing the conductance of the exhaust system. However, the control system can not control the speed at which the vacuum pressure value in the reaction chamber 110 approaches the desired value (referred to as "vacuum pressure changing speed" hereinafter).

In the field of recent semiconductor manufacturing apparatus or line, it is required to prevent particles from flying up in the reaction chamber 110 in order to more improve the quality of a thin film formed on the wafer in the reaction chamber 110.

For that, when evacuation of the reaction chamber 110 is conducted so that the vacuum pressure value in the reaction chamber 110 which is under atmospheric pressure or a low vacuum near the atmospheric pressure reaches a desired value, the process of exhausting gas from the chamber 110 must be slowly conducted. However, the conventional vacuum pressure control system could not control the progress of exhausting gas from the chamber 110 and could not meet the above requirement.

The conventional vacuum pressure control system is therefore configured such that a bypass valve 117 having a fixed orifice is disposed in parallel to the vacuum proportional opening and closing valve 116, as shown in FIG. 14. In order to control the vacuum pressure in the chamber 110 to the desired vacuum pressure value, the bypass valve 117 is opened while the valve 116 is closed to reduce the vacuum pressure changing speed in the reaction chamber 110 so that the conductance of the exhaust system becomes a predetermined value.

The vacuum pressure changing speed which is reduced in the bypass valve 117 is dependent on only the conductance of the exhaust system when the velocity of gas flow (simply referred to as "gas velocity" hereinafter) which passes through the fixed orifice of the bypass valve 117 is in a sound speed region. On the other hand, the gas velocity shifts to a subsonic speed region when the vacuum pressure in the reaction chamber 110 is reduced to an absolute vacuum in proportion to the exhausted volume of gas therefrom. In this manner, when the gas velocity changes from sound speed to subsonic speed, the vacuum pressure changing speed in the reaction chamber 110 slows down in an inverse function.

When the vacuum pump 113 is actuated to start the exhaust of gas from the reaction chamber 110, of which the inside pressure is initially atmospheric pressure, the vacuum pressure changing speed in the reaction chamber 110 will quicken at a stroke if the fixed orifice of the bypass valve 117 which determines the conductance of the exhaust system is larger than necessary. This is not desirable at all from the viewpoint of preventing the particles from flying up in the reaction chamber 110.

Although a small fixed orifice which determines the conductance of the exhaust system is desirable from the viewpoint of preventing particles from flying up in the reaction chamber 110, it requires a considerable long time until the vacuum pressure in the reaction chamber 110 is regulated to the desired vacuum pressure, resulting in a problem that batch processing time in the chamber 110 is prolonged.

Such the problem would be resolved by using a plurality of bypass valves and needle valves in addition to the above mentioned bypass valve 117, all of which are disposed in parallel to the proportional valve 116. However, this configuration goes against the trend in recent years to reduce the size and cost of semiconductor manufacturing apparatus.

SUMMARY OF THE INVENTION

The present invention has been made in view of the above circumstances and has an object to overcome the above problems and to provide a vacuum pressure control system capable of preventing particles from flying up in a vacuum vessel by controlling the opening degree of a vacuum proportional opening and closing valve to change the vacuum pressure in the vacuum vessel to a desired vacuum at a predetermined vacuum pressure changing speed commanded from the exterior or determined and stored in advance in a controller to proceed slowly the process of exhausting gas from the vacuum vessel, thereby reducing the gas velocity in the vacuum vessel, and simultaneously, capable of shortening the time required for controlling the vacuum pressure in the vacuum vessel to the desired vacuum.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, according to the first aspect of the present invention, there is provided a vacuum pressure control system including a vacuum pressure proportional opening and closing valve which is disposed on a pipe connecting a vacuum vessel to a vacuum pump and changes its opening degree to regulate vacuum pressure in the vacuum vessel, and a vacuum pressure sensor for measuring the vacuum pressure in the vacuum vessel, the system controlling the opening degree of the vacuum pressure proportional opening and closing valve based on a measured vacuum pressure value output from the vacuum pressure sensor, wherein the vacuum proportional opening and closing valve is controlled to open from a closed state at a predetermined minute opening degree to allow a small quantity of gas mass-flow to be exhausted from the vacuum vessel so that velocity of gas flow in the vacuum vessel is reduced to prevent particles from flying up in the vacuum vessel.

According to the second aspect of the present invention, there is provided a vacuum pressure control system for executing feedback control on vacuum pressure in a vacuum vessel in a range from atmospheric pressure to high vacuum pressure, the system including a vacuum vessel disposed on a semiconductor manufacturing line, a vacuum pump for exhausting gas from the vacuum vessel, a vacuum proportional opening and closing valve which is disposed on a pipe connecting the vacuum vessel to the vacuum pump and changes its opening degree to regulate vacuum pressure in the vacuum vessel, the valve including a poppet valve configuration, a vacuum pressure sensor for measuring the vacuum pressure in the vacuum vessel, a controller which generates an external command based on a difference between the vacuum pressure value output from the vacuum pressure sensor and a desired vacuum pressure value given from an exterior, and an air pressure control part which manipulates the opening degree of the vacuum proportional opening and closing valve in accordance with the external command, wherein a vacuum pressure value calculated based on a set vacuum pressure changing speed given from the exterior or determined and stored in advance in the controller is sequentially generated in the controller as an internal command, while a desired value of the feedback control is changed in sequence by the internal command to execute the feedback control as follow-up control, and the vacuum pressure in the vacuum vessel is changed at the set vacuum pressure changing speed so that a process of exhausting gas from the vacuum vessel can be slowly proceeded.

In the above vacuum pressure control system, preferably, the set vacuum pressure changing speed is changeable by means of a host control device which controls the semiconductor manufacturing line even during execution of the feedback control as the follow-up control.

The above vacuum pressure control system, preferably, further includes a pneumatic cylinder which serves as an actuation source of the vacuum proportional opening and closing valve, and the pneumatic cylinder is pressurized in advance of a start of the feedback control in order to remove a dead zone characteristic of the vacuum proportional opening and closing valve.

The above vacuum pressure control system, preferably, further includes a potentiometer for measuring positions of a piston rod of the pneumatic cylinder, and the pneumatic cylinder is pressurized in advance based on measured results of the potentiometer.

The vacuum pressure control system, preferably, further includes an air pressure sensor for measuring air pressure in the pneumatic cylinder, and the pneumatic cylinder is pressurized in advance based on measured results of the air pressure sensor.

Preferably, the pneumatic cylinder is pressurized in advance up to an instant preceding actuation.

In the vacuum pressure control system, preferably, a constant value control setting a value which is slightly changed from the vacuum pressure value in the vacuum vessel as a desired value of the feedback control is executed for a predetermined time immediately after the previous pressurization on the pneumatic cylinder so that the dead zone characteristic of the vacuum proportional opening and closing valve is surely removed.

In vacuum pressure control system configured as above, the vacuum pressure in the vacuum vessel disposed on the semiconductor manufacturing apparatus or line is measured by the vacuum pressure sensor. A difference between the measured pressure value and a desired vacuum pressure value commanded from the exterior is calculated. Based on the difference, the controller generates an external command to cause the air pressure control section to control the opening degree of the vacuum proportional opening and closing valve. The conductance of the exhaust system from the vacuum vessel to the vacuum pump is changed accordingly. Thus, the feedback control for maintaining the vacuum pressure in the vessel from which gas is exhausted by the vacuum pump at the desired vacuum pressure value in a range from atmospheric pressure to a high vacuum.

At this time, the controller successively generates internal commands each representing a vacuum pressure value calculated based on the measured vacuum pressure in the vacuum vessel by the vacuum pressure sensor and the predetermined vacuum pressure changing speed commanded from the exterior or determined and stored in advance in the controller. This internal command is set as a desired value of the feedback control. By sequentially changing the desired value, the feedback control is executed as follow-up control. Accordingly, the vacuum pressure in the vacuum vessel can be uniformly changed at the predetermined vacuum pressure changing speed.

That is to say, in the vacuum pressure control system of the present invention, the opening degree of the proportional valve is manipulated so that the vacuum pressure in the vacuum vessel can be uniformly changed at the predetermined vacuum pressure changing speed given from the exterior or determined and stored in advance in the controller. If a small value of the predetermined vacuum pressure changing speed is given from the exterior, the process of exhausting (sucking) gas from the vacuum vessel can be conducted slowly. This makes it possible to prevent particles from flying up in the vacuum vessel.

In addition, the vacuum pressure in the vacuum vessel can be uniformly changed at the predetermined vacuum pressure changing speed given from the exterior or determined and stored in advance in the controller until the vacuum pressure in the vacuum vessel reaches the desired vacuum pressure value. Accordingly, unlike the vacuum pressure changing speed reduced in the bypass described in the prior art, the vacuum pressure changing speed in the vacuum vessel of the present invention does not slow down in an inverse function. This makes it possible to shorten the time needed to control the vacuum pressure in the vacuum vessel to the desired vacuum pressure value. Therefore, it will greatly contribute to the shortening for batch processing time in the vacuum vessel disposed on the semiconductor manufacturing line.

In the vacuum pressure control system of the present invention, the feedback control of manipulating the opening degree of the vacuum proportional opening and closing valve is executed as the follow-up control so that the vacuum pressure in the vacuum vessel is uniformly changed at the predetermined vacuum pressure changing speed given from the exterior or determined and stored in advance in the controller. This system does not need to use any bypass valves mentioned in the prior art. Such the removal of bypass valves makes it possible to achieve a small-sized and low-cost semiconductor manufacturing apparatus.

Since the vacuum pressure in the vacuum vessel can be uniformly changed at the predetermined vacuum pressure changing speed given from the exterior or determined in advance in the controller, the process of exhausting gas from the vacuum vessel can be conducted at a desired proceeding rate. This differs from the prior art in which the proceeding rate at which gas is exhausted from the vacuum vessel is determined according to the size of a fixed orifice of the bypass valve.

In the vacuum pressure control system of the present invention, even during execution of the feedback control as the follow-up control, the predetermined vacuum pressure changing speed can be changed by means of a host control device which controls the semiconductor manufacturing line. The progress of exhausting gas from the vacuum vessel can be controlled at a desired proceeding rate while considering conditions of the whole semiconductor manufacturing process.

Furthermore, when the vacuum pressure control system of the present invention is provided with a pneumatic cylinder as an actuation source for actuating the vacuum proportional opening and closing valve, the pneumatic cylinder is pressurized in advance of the start of feedback control in order to prevent the proportional opening and closing valve from having a dead zone. Therefore, no response delay will arise when the vacuum pressure in the vacuum vessel is uniformly changed at the predetermined vacuum pressure changing speed given from the exterior or determined and stored in advance in the controller.

However, the degree of pressure to be exerted in advance on the pneumatic cylinder is delicately different according to different conditions due to factors such as displacements of a mechanical zero point of the vacuum proportional opening and closing valve, differences in pressure between the vacuum vessel and the vacuum pump, etc. For eliminating the dead zone characteristic of the vacuum proportional valve, preferably, a constant value control is executed for a predetermined time immediately after a predetermined pressure is exerted in advance on the pneumatic cylinder. The constant value control is conducted using a value slightly changed from the pressure value in the vacuum vessel as a desired value of the feedback control. In this manner, the occurrence of response delay can be prevented when the vacuum pressure in the vacuum vessel is uniformly changed at the predetermined vacuum pressure changing speed commanded from the exterior or determined and stored in the controller. Consequently, it is possible to optimize the initial state where the process of exhausting gas from the vacuum vessel is slowly executed.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of preferred embodiments of a vacuum pressure control system embodying the present invention will now be given referring to the accompanying drawings.

It is to be noted that the vacuum pressure control system in the following embodiments has a similar structure to that of the vacuum pressure control system disclosed in Japanese Patent No. 2,677,536. The detail thereof is referred to that patent and omitted from the present embodiments.

Accordingly, only a schematic structure thereof will be simply described below.

Figure 5:
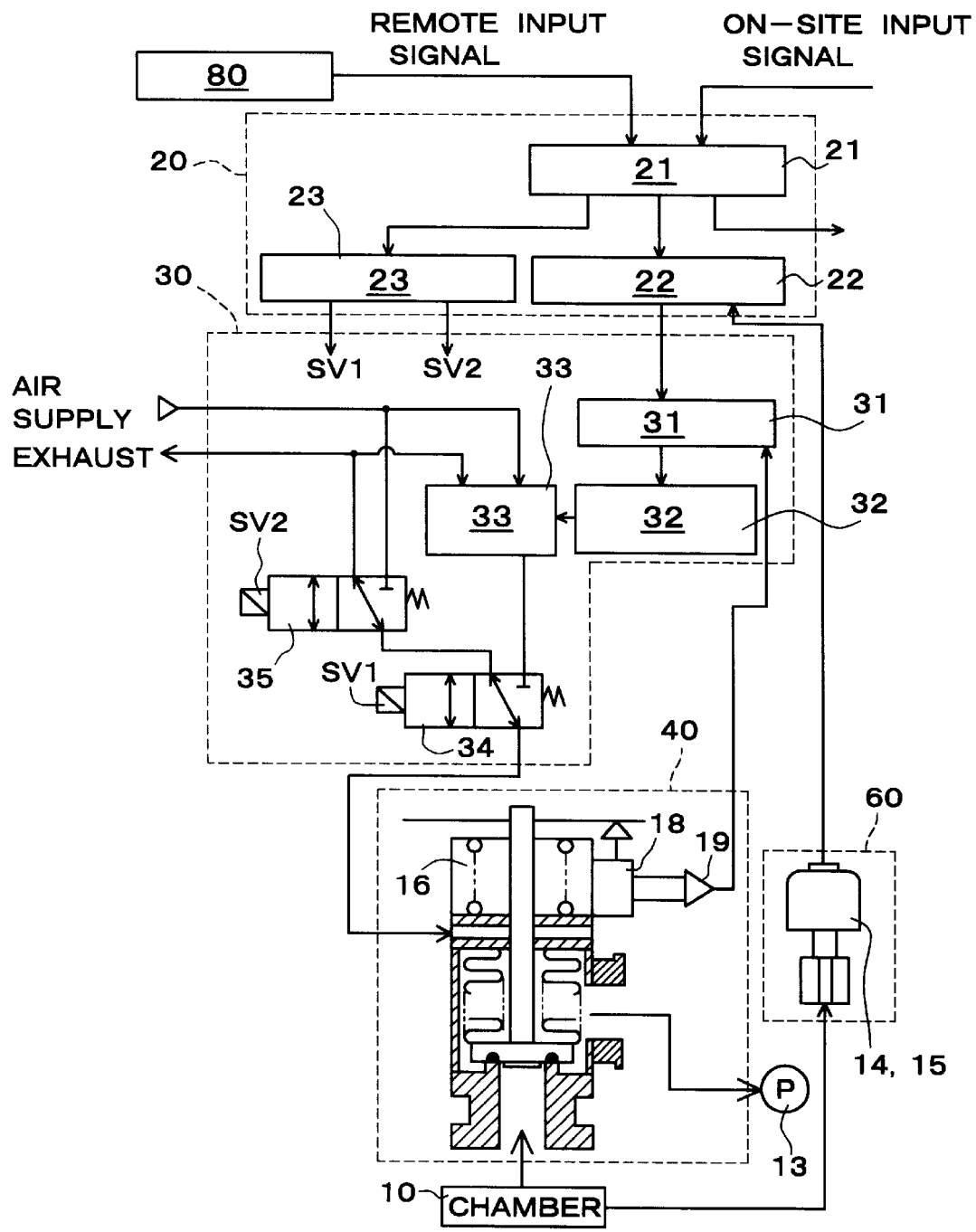
FIG. 5 is a block diagram of schematically showing the vacuum pressure control system in the first embodiment.

FIG. 5 is a block diagram of the vacuum pressure control system in the first embodiment according to the present invention.

The system is mainly constructed of a controller 20, an air pressure control section 30, a vacuum proportional opening and closing valve 16 (referred to as "vacuum proportional O/C valve" hereinafter) which constructs an operating section 40, and vacuum pressure sensors 14 and 15 which construct a detecting section 60. The vacuum proportional O/C valve 16 in the system is connected to a reaction chamber 10 of which the pressure is to be controlled.

The controller 20 includes an interface circuit 21, a vacuum pressure control circuit 22, and a sequential control circuit 23. The interface circuit 21 is the circuit which converts a signal input with buttons on a front panel (not shown) of the controller 20 on an operating site and a signal input with a central control device 80 on a remote site and transmitted therefrom to the controller 20 through a connector (not shown) of a backpanel of the controller 20 into the signal suitable for the vacuum pressure control circuit 22 and the sequence control circuit 23.

The vacuum pressure control circuit 22 is the circuit which performs the feedback control by PID control with respect to the vacuum pressure in the reaction chamber 10. The sequence control circuit 23 is the circuit which actuates a drive coil SV1 of a first solenoid valve 34 and a drive coil SV2 of a second solenoid valve 35 in the air pressure control section 30 in accordance with an operating mode signal transmitted from the interface circuit 21.

The air pressure control section 30 consists of a position control circuit 31, a pulse drive circuit 32 connected to the position control circuit 31, a timed on-off actuation valve 33 connected to the pulse drive circuit 32, and the first and second solenoid valves 34 and 35. The position control circuit 33 is also connected to a potentiometer 18 of the vacuum proportional O/C valve 16 via an amplifier 19, and makes comparison between a command value of a valve opening degree transmitted from the vacuum pressure control circuit 22 and a measured value transmitted from the potentiometer 18 which detects the position of a piston 44 (see FIG. 3) of the vacuum proportional O/C valve 16 in order to control the position of a valve 45 (see FIG. 3) of the valve 16. The pulse drive circuit 32 is the circuit which transmits pulse signals to the timed on-off actuation valve 33 in response to control signals transmitted from the position control circuit 31.

The timed on-off actuation valve 33 is internally provided with an air supply proportional valve and an exhaust proportional valve, which are not shown. The valve 33 is the circuit which drives the proportional valves to make a timed on-off actuation in response to the pulse signals transmitted from the pulse drive circuit 32, whereby to control the air pressure in a pneumatic cylinder 41 (see FIG. 3) of the vacuum proportional O/C valve 16 via the first solenoid valve 34.

Figure 3:
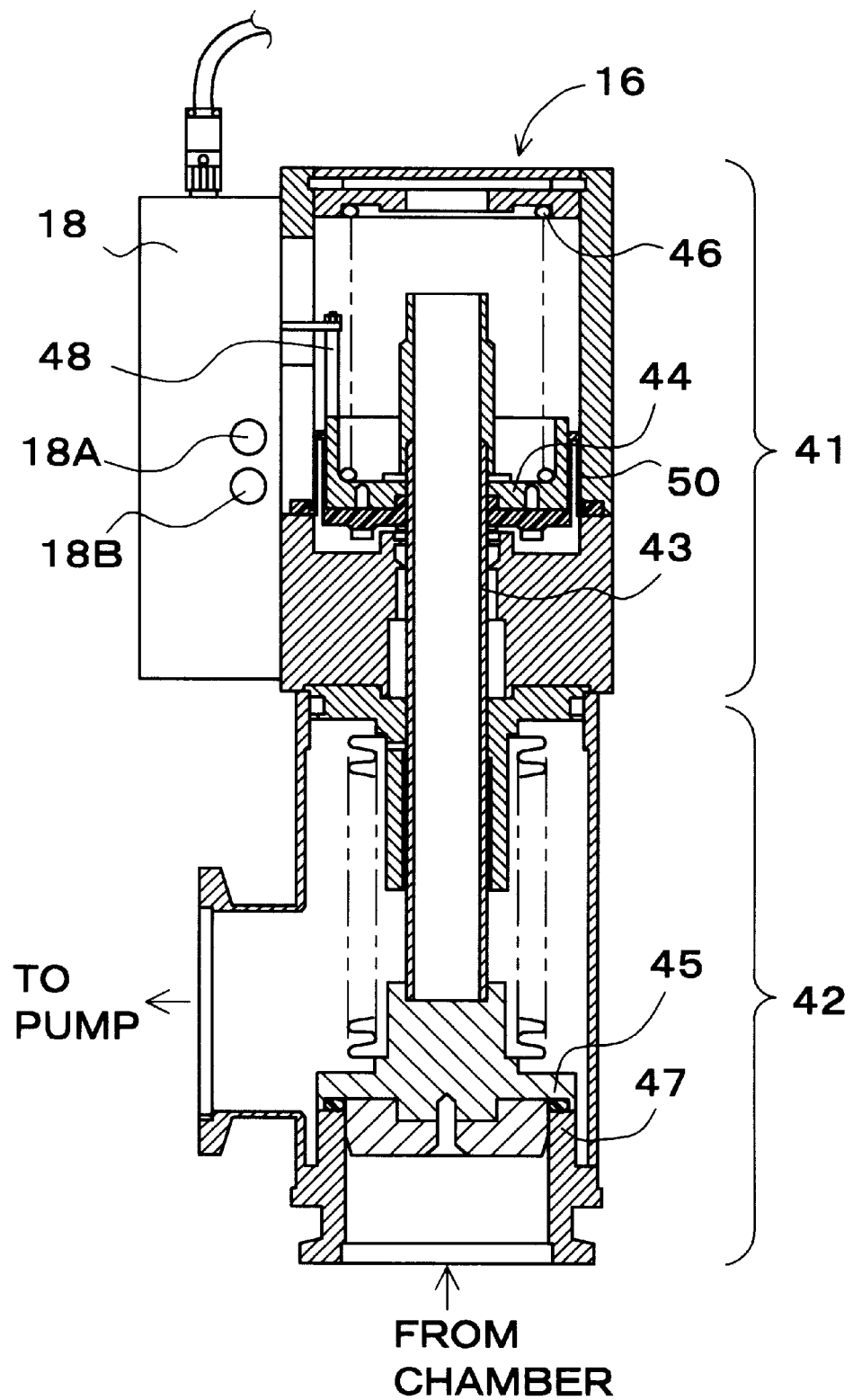
FIG. 3 is a cross sectional view of a vacuum proportional opening and closing valve used in the vacuum pressure control system, the valve being in a closed state.
Figure 4:
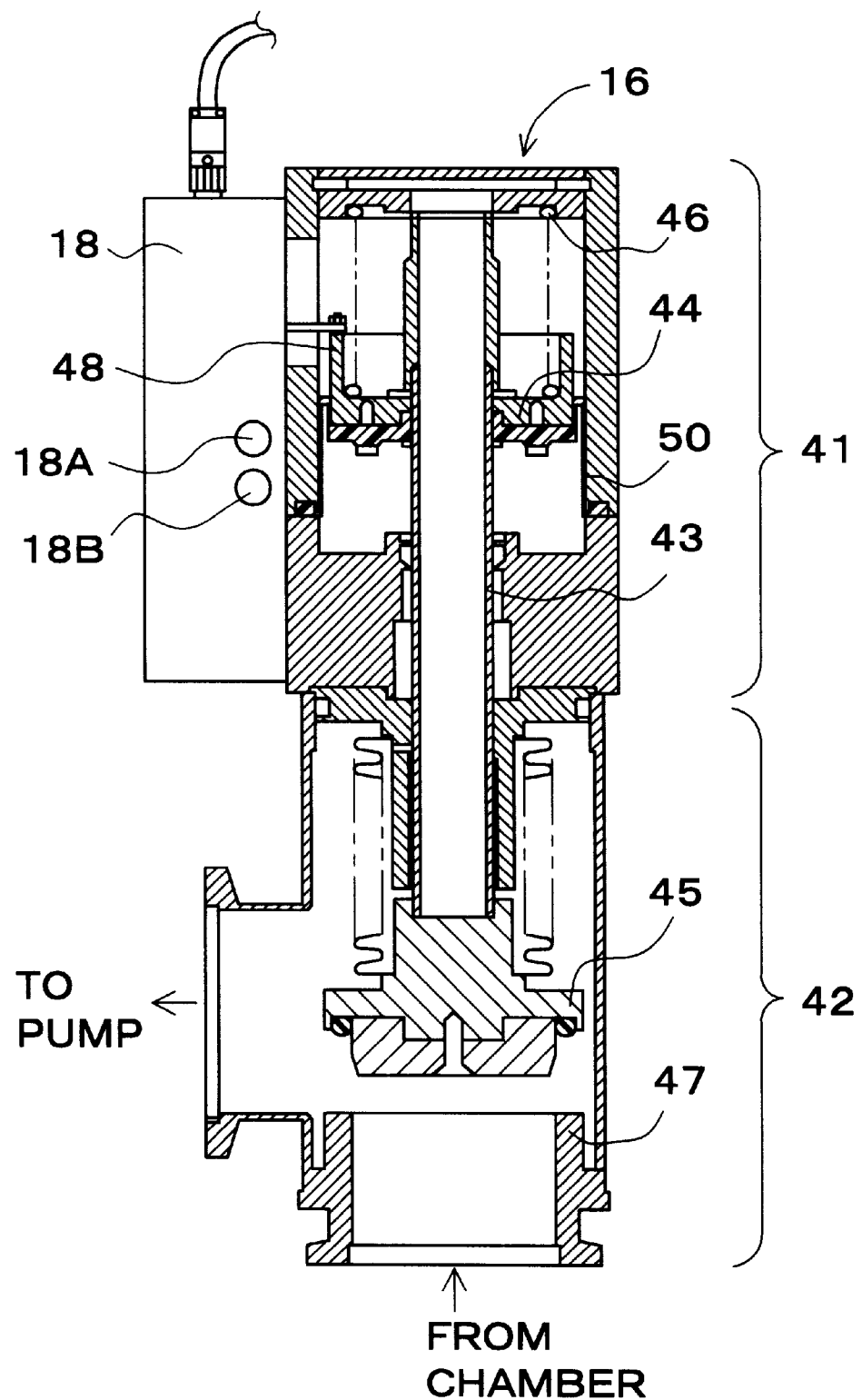
FIG. 4 is a cross sectional view of the vacuum proportional opening and closing valve of FIG. 3, it being in an open state.

The vacuum proportional O/C valve 16 which constructs the operating section is operated to change the conductance of an exhaust system from the reaction chamber 10 to the vacuum pump 13. FIGS. 3 and 4 shows cross sectional views of the vacuum proportional O/C valve 16. As shown in FIGS. 3 and 4, the valve 16 is mainly constructed of a pneumatic cylinder 41 and a bellows-type poppet valve 42 disposed under the cylinder 41. The valve 16 is provided with a piston rod 43 disposed in the center of valve 16. The piston rod 43 is fitted in a piston 44 within the pneumatic cylinder 41. The other end of the piston rod 43 projects into the poppet valve 42 and is connected with a poppet valve member 45. Accordingly, when the piston 44 is moved upward by the air pressure supplied into the pneumatic cylinder 41, the poppet valve member 45 is moved upward at the same time (FIG. 4). In the cylinder 41, a bellofram 50 having an outer periphery and an inner periphery is joined at its outer periphery with the inner wall of the cylinder 41 and at its inner periphery with the bottom of the piston 44, thereby dividing the inside of the cylinder 41 into both sides of the piston 44 in the axial direction.

When the pneumatic cylinder 41 of the vacuum proportional O/C valve 16 configured as above is not supplied with compressed air through a supply port 18A while the cylinder 41 is communicated with an exhaust line via an exhaust port 18B, the downward biasing force of a return spring 46 is exerted on the piston 44. As shown in FIG. 3, the poppet valve 45 is thus brought into contact with a valve seat 47, then blocking a flow passage (which communicates with an outlet of the reaction chamber 10) formed in the center of the valve seat 47. Thus, the vacuum proportional O/C valve 16 is closed.

On the other hand, when the pneumatic cylinder 41 is supplied with compressed air via the supply port 18A, the downward biasing force of the return spring 46 and the upward force or pressure of the compressed air in the cylinder 41 are simultaneously exerted on the piston 44. In proportion to a balance between the downward force and the upward force, the piston 44 is moved upward so that the poppet valve member 45 is separated from the valve seat 47 as shown in FIG. 4. Thus, the vacuum proportional O/C valve 16 is put in an open state. Accordingly, the reaction chamber 10 is put into communication with the vacuum pump 13 through the valve 16, so that gas is sucked from the reaction chamber 10 in accordance with the opening degree of the valve 16 (i.e., the distance between the valve member 45 and the valve seat 47).

The distance which the poppet valve member 45 is separated from the valve seat 47, which is considered as a valve lifting amount, can be controlled by the supply and exhaust of compressed air with respect to the pneumatic cylinder 41. It is to be noted that the lifting amount of the valve member 45 is measured by the potentiometer 18 with a slid lever 48 connected to the piston 44 and corresponds to the opening degree of the vacuum proportional O/C valve 16.

The vacuum pressure sensors 14 and 15 constructing the detecting section are capacitance manometers which measure the vacuum pressure in the reaction chamber 10. In the present embodiment, two capacitance manometers are appropriately used according to the range of the vacuum pressure to be measured.

In the vacuum pressure control system in the first embodiment described above, when a forced-closing (CLOSE) mode is selected as an operating mode on the front panel of the controller 20, the sequence control circuit 23 actuates the first and second solenoid valves 34 and 35 respectively to bring into an OFF state (FIG. 5). Accordingly, no compressed air is supplied to the pneumatic cylinder 41, and the internal pressure of the cylinder 41 becomes atmospheric pressure, allowing the piston 43 to move downward by the biasing force of the spring 46. The valve member 45 is then brought into contact with the valve seat 47. Thus, the vacuum proportional O/C valve 16 is put in a closed state.

When a vacuum pressure control (PRESS) mode is selected as an operating mode on the front panel of the controller 20, the sequence control circuit 23 actuates the first and second solenoid valves 34 and 35 respectively to be put into an OFF state (FIG. 5), allowing the timed on-off actuation valve 33 to communicate with the pneumatic cylinder 41. The air pressure in the cylinder 41 of the vacuum proportional O/C valve 16 is regulated, so that the lifting amount of the valve member 45 is put in a state where it is controllable by the cylinder 41.

The vacuum pressure control circuit 22 starts the feedback control with a desired vacuum pressure value commanded by the on-site input or the remote input. Specifically, the vacuum pressure sensors 14 and 15 measure the current vacuum pressure in the reaction chamber 10. The controller 20 receives the measured value from the vacuum pressure sensors 14 and 15, and regulates the lifting amount of the valve member 45 in proportion to a difference (or controlled deviation) between the measured value and the desired value to change the conductance of the exhaust system. The vacuum pressure in the reaction chamber 10 is thus maintained constant at the desired vacuum pressure.

The vacuum pressure control circuit 22 controls such that a manipulated variable of the feedback control becomes a maximum when the controlled deviation of the feedback control is large, so that a sufficient quick response property of the feedback control is ensured. When the controlled deviation is small, to the contrary, the time constant shifts step by step to the time constant which has been adjusted in advance. Accordingly, the vacuum pressure in the reaction chamber 10 can be maintained in a stable condition.

Figure 12:
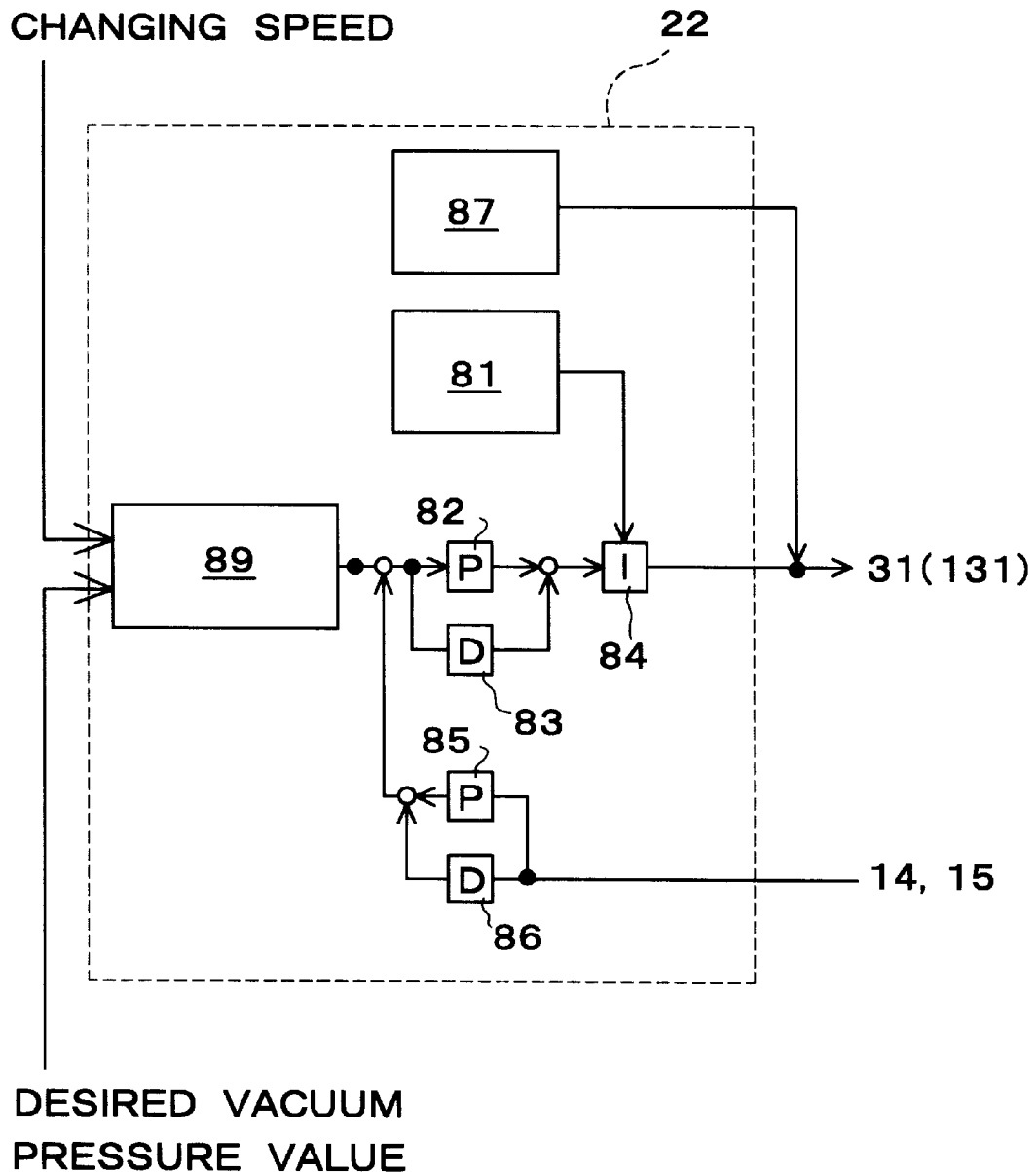
FIG. 12 is a block diagram of showing in detail a vacuum pressure control circuit in the first and second embodiments.

FIG. 12 is a block diagram of showing in detail the vacuum pressure control circuit 22. As shown in FIG. 12, the vacuum pressure value in the reaction chamber 10 measured by the vacuum pressure sensors 14 and 15 is adjusted in a proportional-differential circuit 85 and 86. The adjusted value is compared with the desired vacuum pressure value commanded by the on-site input or the remote input and is input in proportional-integral-differential circuits 82 and 83. Then, an integral circuit 84 connected in series outputs a predetermined voltage, for example, in a range of 0–5V in the present embodiment, to the position control circuit 31. The time constant of the integral circuit 84 is determined by an integral time-adjustment circuit 91.

When the measured value output from the vacuum pressure sensors 14 and 15 is far from the desired vacuum pressure value, an internal computing circuit operates so that the integral time of the integral circuit 84 becomes minimum. The integral circuit 84 functions as an amplification circuit having an almost infinite gain.

Specifically, when the measured value by the sensors 14 and 15 is larger than the desired value, the integral circuit 84 outputs a voltage of 5V which is the maximum value to the position control circuit 31. As a result, the vacuum proportional O/C valve 16 is actuated to rapidly open.

On the other hand, when the measure value from the sensors 14 and 15 is smaller than the desired value, the integral circuit 44 outputs a voltage of 0V which is the minimum value to the position control circuit 31. As a result, the vacuum proportional O/C valve 16 is actuated to rapidly close.

By the operation mentioned above, in the shortest time the opening degree of the valve 16 can be made close to the degree which provides the desired vacuum pressure.

Thereafter, when the integral time-adjustment circuit 81 judges that the opening degree has reached near the degree which provides the desired vacuum pressure, it makes a shift of the time constant step by step to the time constant of the integral circuit 84 which has been adjusted in advance in order to stably maintain the opening degree at that point.

Furthermore, in the vacuum pressure control system in the first embodiment, when a vacuum pressure changing speed control (SVAC) mode is selected on the front panel of the controller 20 as an operating mode, the changing speed of the vacuum pressure in the reaction chamber 10 can be controlled at the same time when the vacuum pressure in the reaction chamber 10 is controlled to reach the desired vacuum pressure value.

Figure 6:
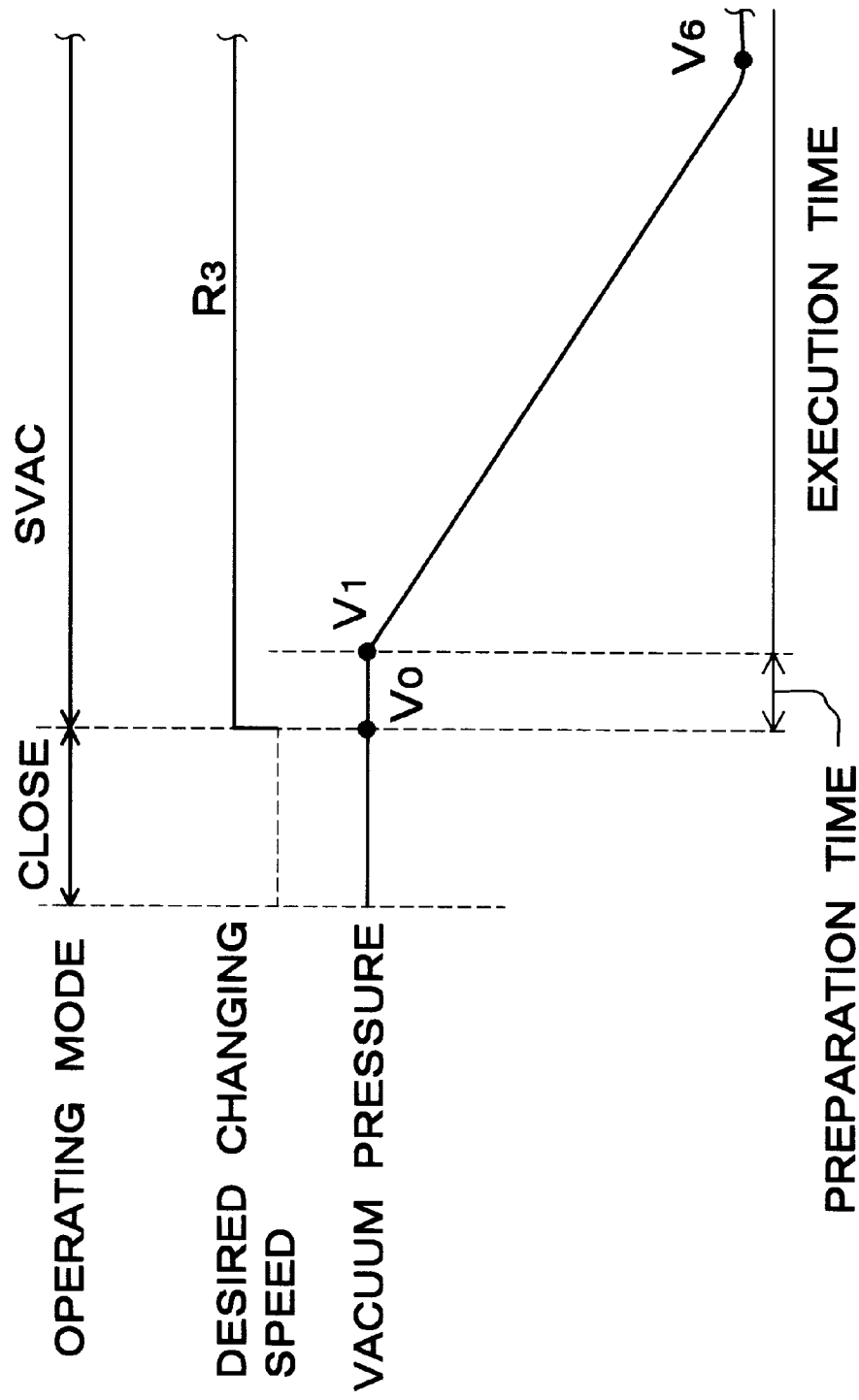
FIG. 6 is a graph showing an example of the vacuum pressure changing speed control mode.

In the present embodiment, explanation is made on the vacuum pressure changing speed control (SVAC) mode where the vacuum pressure changing speed in the reaction chamber 10 is adjusted to the value $R_3$ while the vacuum pressure in the reaction chamber 10 is controlled to change from the atmospheric pressure $V_0$ to a desired vacuum pressure value $V_6$ and then maintained at that value, as shown in FIG. 6. It is to be noted that the SVAC mode is assumed to shift from the CLOSE mode.

Figure 1:
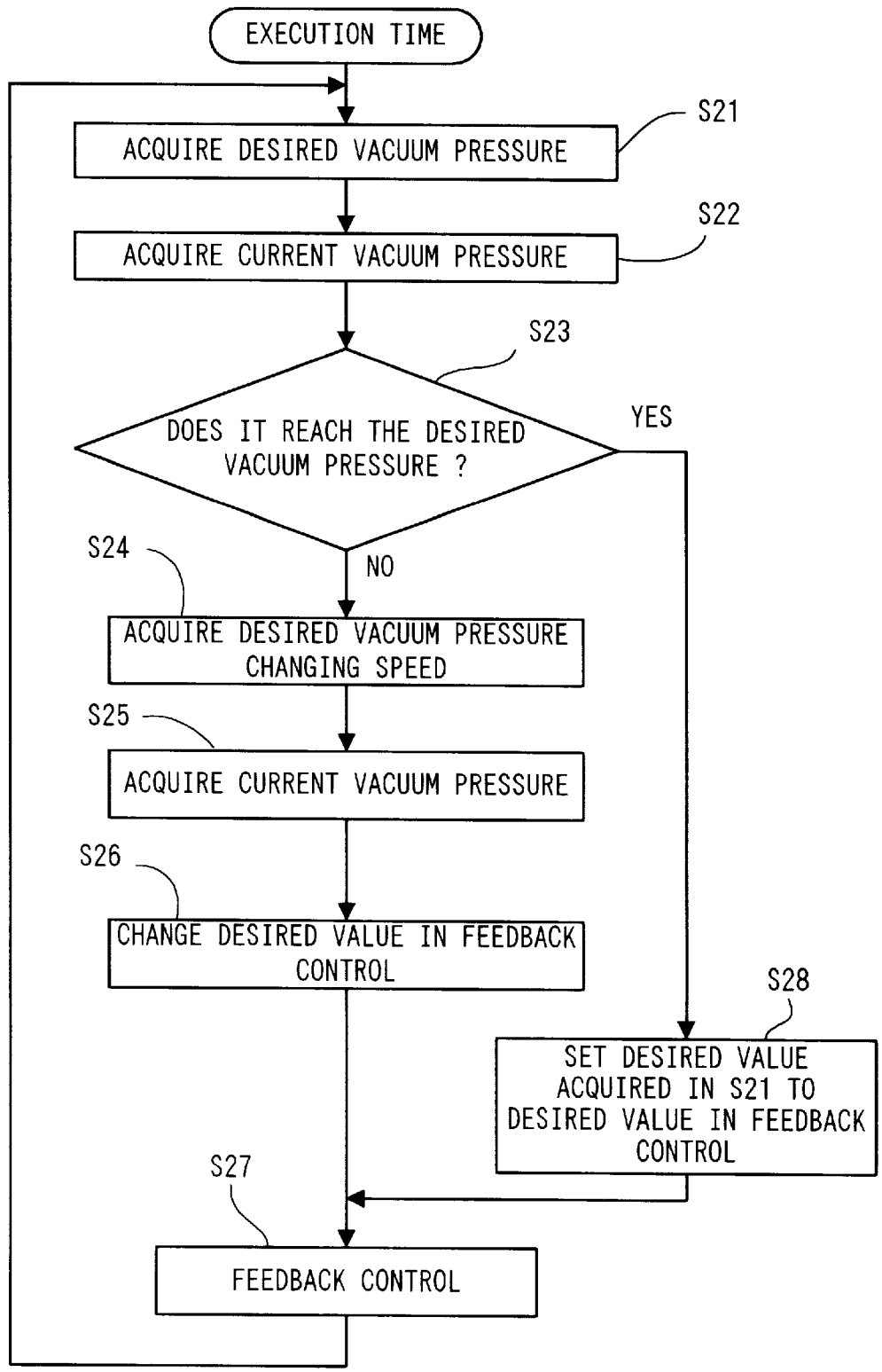
FIG. 1 is a flow chart of execution time (or execution processing) of a vacuum pressure changing speed control mode in a vacuum pressure control system in a first and second preferred embodiments according to the present invention.
Figure 2:
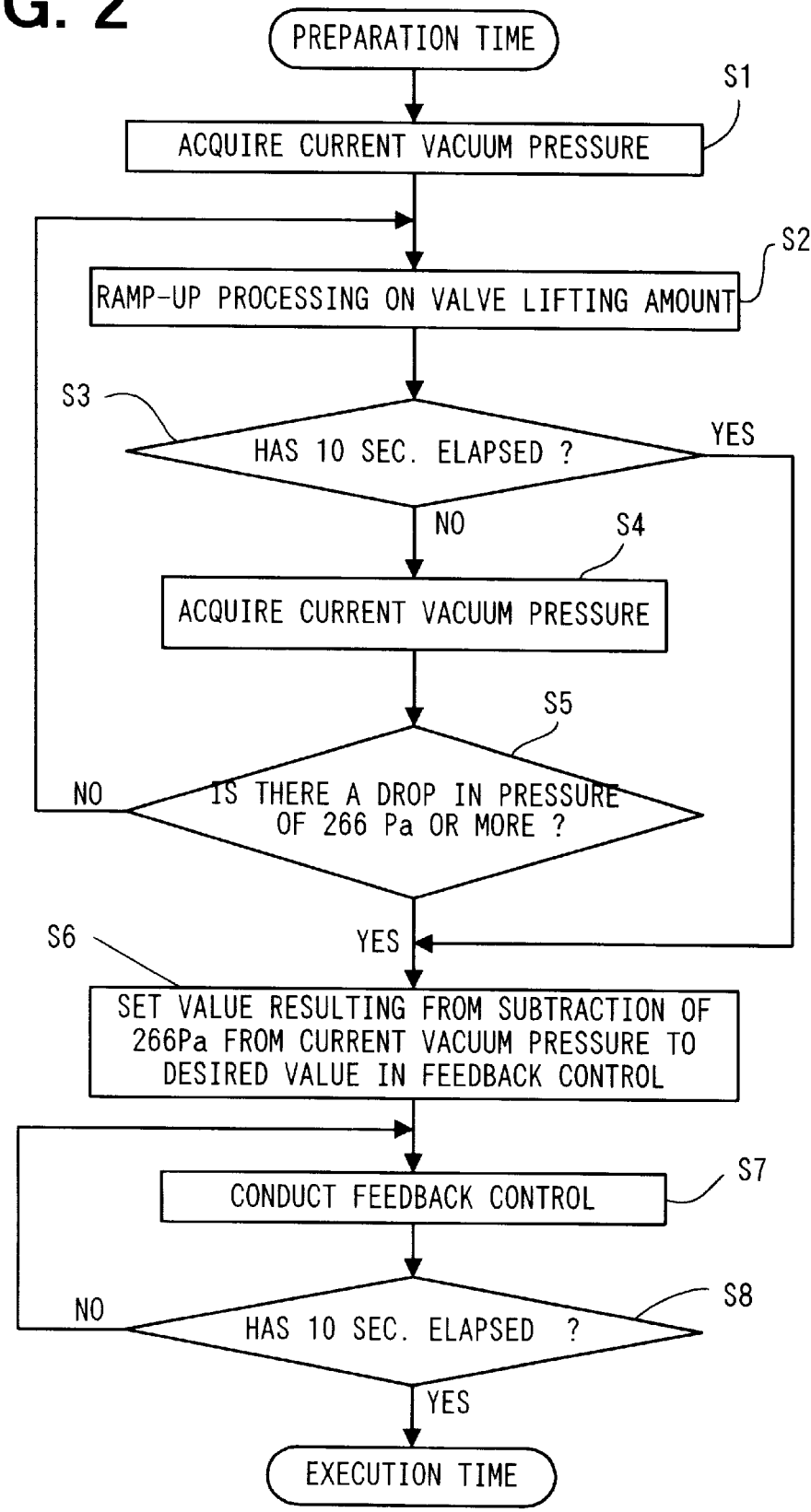
FIG. 2 is a flow chart of preparation time (or preparation processing) of the vacuum pressure changing speed control mode in the vacuum pressure control system in the first embodiment.

The SVAC mode includes two parts in the operation, i.e., a preparation time (or preparation processing) and an execution time (or execution processing). FIG. 2 shows a flow chart of the preparation time in the SVAC mode. FIG. 1 is a flow chart of the execution time in the SVAC mode.

Upon selection of the SVAC mode on the controller 20, the flow first advances to S1 in FIG. 2, where the current vacuum pressure in the reaction chamber 10 is input in the control circuit 22 from the vacuum pressure sensors 14 and 15. In the present embodiment, the current vacuum pressure in the chamber 10 is the atmospheric pressure $V_0$ (see FIG. 6). This value $V_0$ is input in the control circuit 22 accordingly.

Next, in S2, a ramp-up processing is conducted on the valve lifting amount in the vacuum proportional O/C valve 16. This valve 16 is in a closed state at the time of selection of the SVAC mode, because the SVAC mode is assumed to shift from the CLOSE mode in the present embodiment. A bias control circuit 87 therefore outputs a command voltage to the position control circuit 31 and this circuit 31 then transmits a control signal to the pulse drive circuit 32 (see FIGS. 5 and 12) so that the valve lifting amount changes in a ramp function. In the present embodiment, the time $t_1$ is taken as 10 sec. and the valve lifting amount $L_1$ as 0.1266 mm.

In S3, it is judged whether the time $t_1$ (10 sec.) has elapsed. When the time $t_1$ has elapsed (S3: YES), the flow advances to S6. When the time $t_1$ has not elapsed yet (S3: NO), the flow advances to S4 where the control circuit 22 acquires the current vacuum pressure in the reaction chamber 10 from the vacuum pressure sensors 14 and 15. Then, in S5, it is judged whether there is a predetermined drop in the vacuum pressure in the reaction chamber 10. When there is no voltage drop (S5: NO), the flow returns to S2 and the above processing are repeated. It is to be noted that the predetermined voltage drop in the present embodiment is a voltage drop of 266 Pa or more.

On the other hand, when there is a voltage drop of 266 Pa or more (S5: YES), the flow advances to S6. In S6 through S8, the feedback control of the vacuum pressure in the reaction chamber 10 is executed. At this time, the value $V_1$ (see FIG. 6) which is calculated by subtracting 266 Pa from the current vacuum pressure value is set as the desired value of the feedback control. This feedback control is performed as a constant value control until a predetermined time (10 sec. in the present embodiment) has elapsed. When the time (10 sec.) has elapsed from the start of the feedback control (S8: YES), the flow advances to S21 (FIG. 1) in the execution time of the feedback control.

In the execution time shown in FIG. 1, at first, in S21, the desired vacuum pressure value is input via the front panel of the controller 20 on the operating site or via the central control device 80 on the remote site. Next, in S22, the current vacuum pressure in the reaction chamber 10 detected by the vacuum pressure sensors 14 and 15 is input in the controller 20. In S23, the controller 20 judges whether the current vacuum pressure has reached the desired vacuum pressure. When it is judged that the current vacuum pressure has not reached the desired vacuum pressure (S23: NO), the flow advances to S24 where the controller 20 acquires a set value of the vacuum pressure changing speed commanded by the on-site input or the remote input.

In S25, the controller 20 acquires the current vacuum pressure in the reaction chamber 10 detected by the vacuum pressure sensors 14 and 15. In S26, the controller 20 calculates the vacuum pressure value for an internal command based on the current vacuum pressure value acquired in S25 and the set vacuum pressure changing speed acquired in S24. The desired value of the feedback control is changed by the internal command representing the calculated vacuum pressure value. Then, the feedback control is performed with the changed desired value.

Specifically, as shown in FIG. 12, the desired vacuum pressure value and the vacuum pressure changing speed, both of which are commanded by the on-site input or remote input, are output as a voltage in a range of 0–5V from the interface circuit 21 (see FIG. 5). An internal command generation circuit 89 subtracts a predetermined value from the current vacuum pressure value in the reaction chamber 10 in proportion to the vacuum pressure changing speed and outputs the calculated value as the desired value. Subsequent feedback control is the same as in the Japanese Patent No. 2,677,536 and referred herein. The detail explanation thereof is therefore omitted in the present specification.

On the other hand, when the current vacuum pressure in the reaction chamber 10 has reached the desired value (S23: YES), the flow advances to S28 where the desired vacuum pressure value acquired in S21 is set as the desired value of the feedback control. After that, the feedback control is executed in S27. This feedback control is the same as in Japanese Patent No. 2,377,536.

It is to be noted that the flow after the feedback control in S27 returns to S21 and the processing therefrom is repeated unless the operating mode is changed from the SVAC mode to a different mode.

Figure 7:
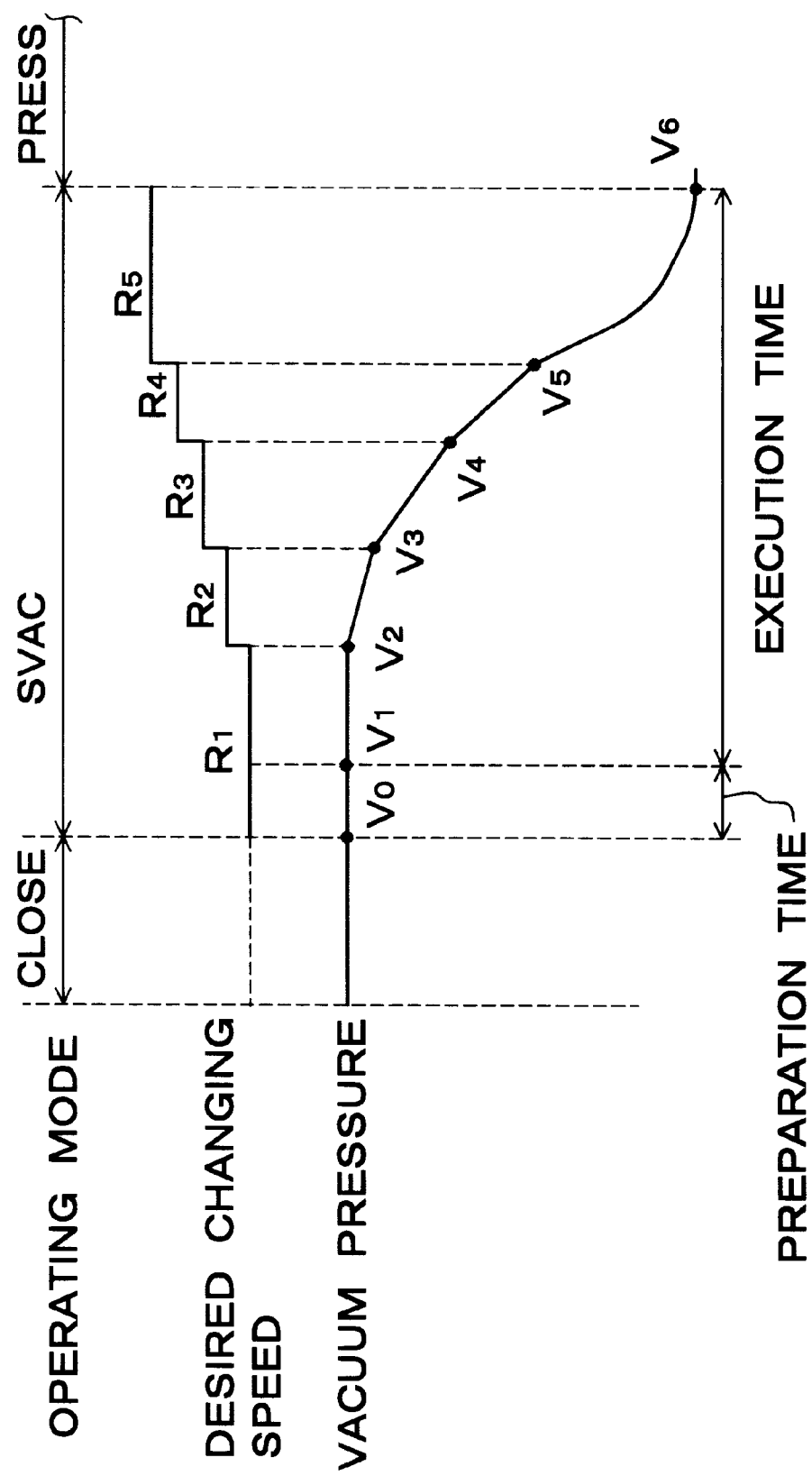
FIG. 7 is a graph showing another example of the vacuum pressure changing speed control mode.

In the SVAC mode, additionally, the set vacuum pressure changing speed can be optionally changed. For example, as shown in FIG. 7, when the vacuum pressure in the reaction chamber 10 is changed from the atmospheric pressure $V_0$ to the desired vacuum pressure value $V_6$ and maintained at that pressure value, the set changing speed of the vacuum pressure in the reaction chamber 10 can be controlled at plural values $R_1$, $R_2$, $R_3$, $R_4$ and $R_5$ based on the measured vacuum pressure values.

For that purpose, when the set vacuum pressure changing speed is acquired in S24, it is controlled so that the changing speed value is changed to a value $R_1$ at the time when the vacuum value in the reaction chamber 10 is $V_0$; to a value $R_2$ at $V_2$; to a value $R_3$ at $V_3$; to a value $R_4$ at $V_4$; and to a value $R_5$ at $V_5$, respectively.

As described above, the set vacuum pressure changing speed is output into the internal command generation circuit 89 (see FIG. 12) as a voltage in a rage of 0–5V. Accordingly, a change in the output voltage can causes a change in the set vacuum pressure changing speed. For example, if the set vacuum pressure changing speed of 13.3–2660 Pa/sec. is output as the output voltage of 0–5V, 0V corresponds to 13.3 Pa/sec.; 0.25V to 133 Pa/sec.; 1.25V to 665 Pa/sec; 2.5V to 1330 Pa/sec.; and 5V to 2660 Pa/sec., respectively.

During the execution time shown in FIG. 1, accordingly, the desired vacuum changing speed can be changed by the on-site input on the front panel of the controller 20 or the remote input from the central control device 80 without relation to the vacuum pressure in the reaction chamber 10. The set vacuum pressure changing speed may be changed in accordance with the elapsed time in the execution time of FIG. 1. Furthermore, the set vacuum pressure changing speed may be determined and stored in advance in the controller 20. In those manners, the vacuum pressure in the reaction chamber 10 can be changed along an optional pressure curve.

Next, a second embodiment of the vacuum pressure control system according to the present invention will be described, referring to FIGS. 8 and 9. FIG. 9 is a block diagram of the vacuum pressure control system in the second embodiment. Different features from the first embodiment are only in that an air pressure sensor 70 which measures the air pressure in the pneumatic cylinder 41 of the vacuum proportional O/C valve 16 is provided instead of the potentiometer 18 and the amplifier 19 in the first embodiment and that an air pressure control circuit 131 instead of the position control circuit 31. Accordingly, the valve lifting amount of the proportional O/C valve 16 is measured through the air pressure in the pneumatic cylinder 41 (see FIGS. 3 and 4), the air pressure being detected by the air pressure sensor 70. It is to be noted that the structure of the vacuum proportional O/C valve 16 is the same as in the first embodiment and it is referred to FIGS. 3 and 4.

Figure 8:
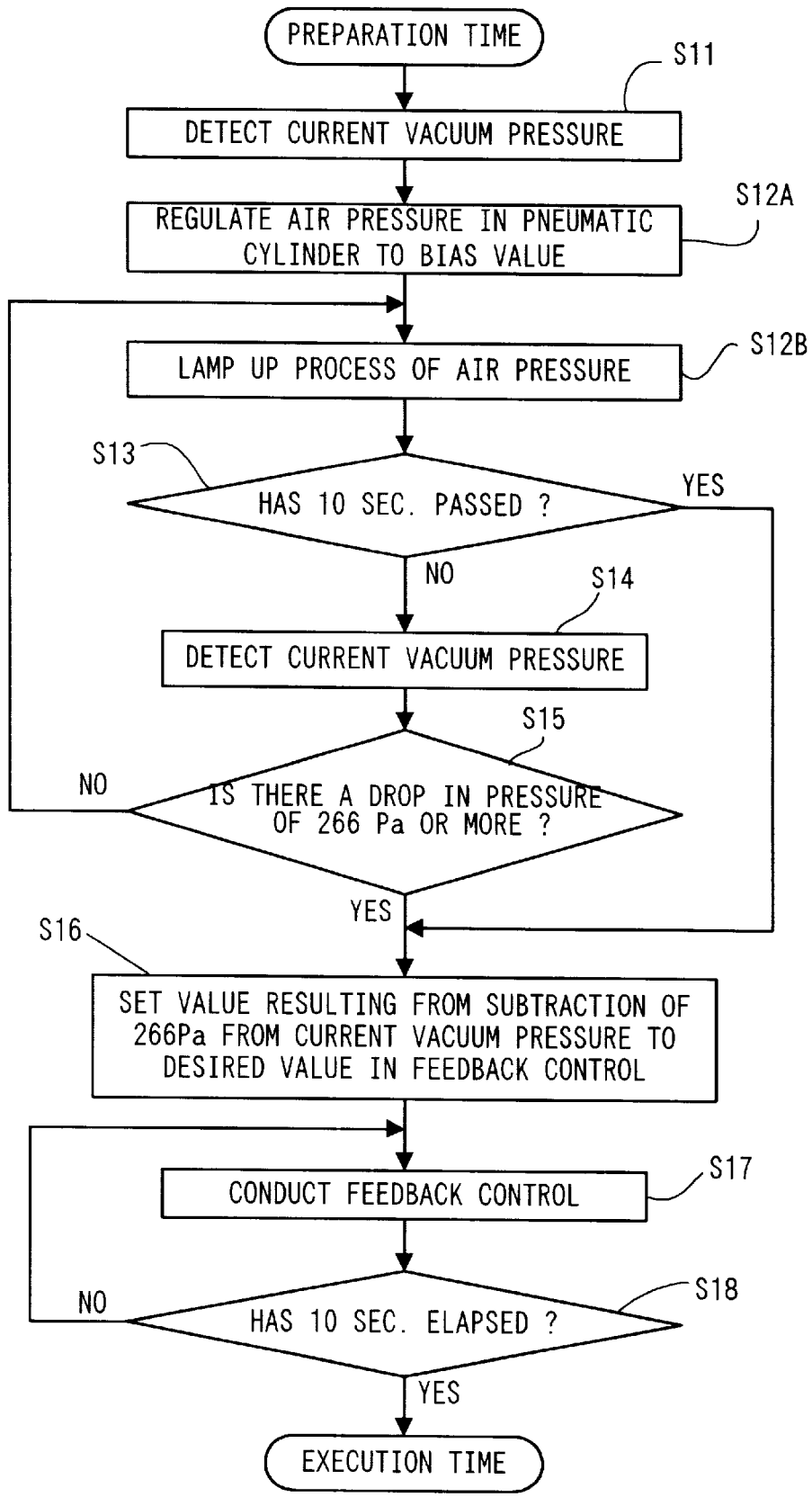
FIG. 8 is a flowchart of preparation time (or preparation processing) of the vacuum pressure changing speed control mode in the vacuum pressure control system in the second embodiment.
Figure 9:
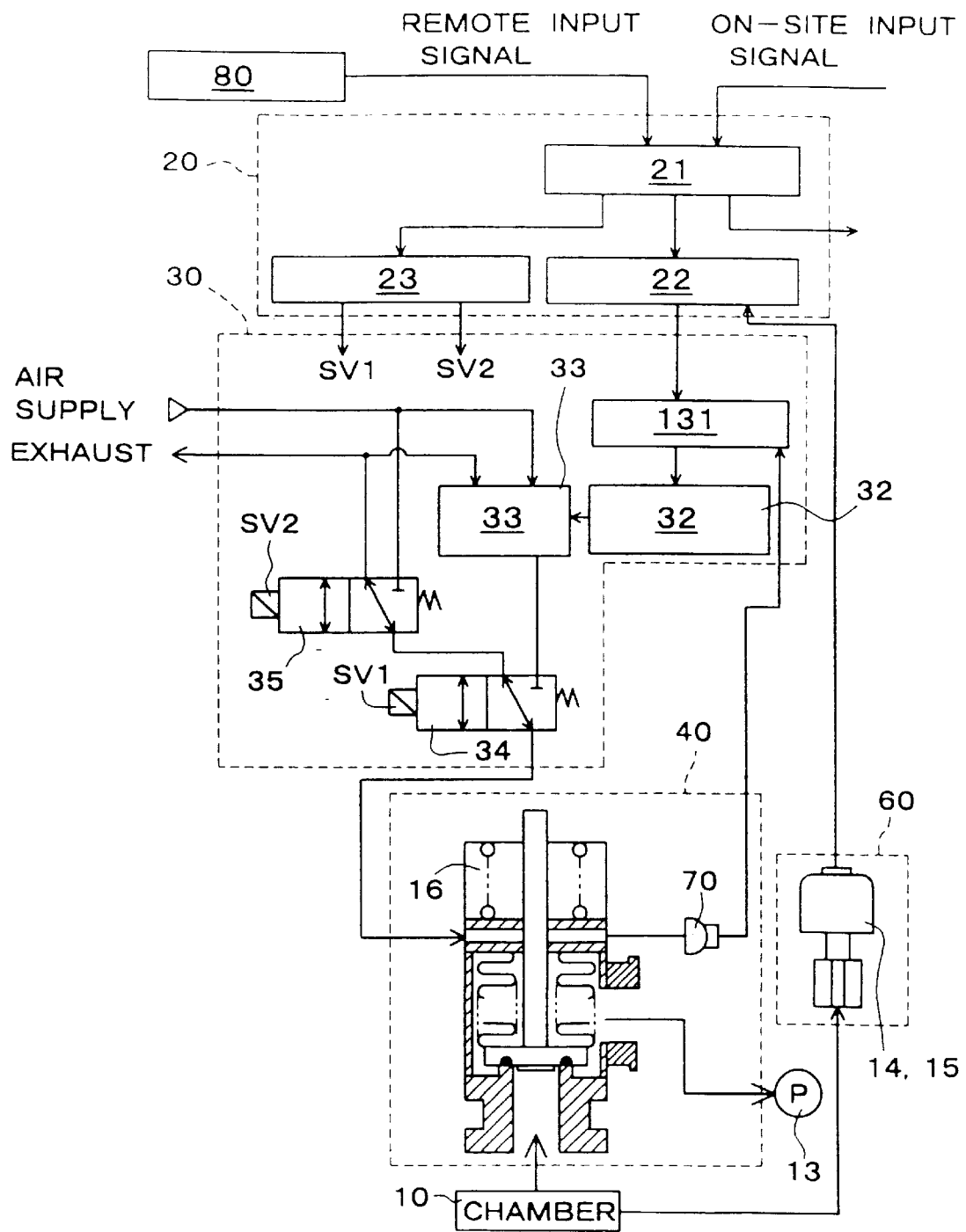
FIG. 9 is a block diagram of schematically showing the vacuum pressure control system in the second embodiment.

FIG. 8 is a flowchart of the preparation time in a vacuum pressure changing speed control (SVAC) mode in the second embodiment. In the vacuum pressure control system in the second embodiment, upon the SVAC mode is selected on the controller 20, the controller 20 acquires the current vacuum pressure in the reaction chamber 10 via the vacuum pressure sensors 14 and 15 in S11.

Subsequently, in S12A, in order to regulate the air pressure in the pneumatic cylinder 41 to a value (a bias value) immediately preceding the start of actuation of the poppet valve 45 of the vacuum proportional O/C valve 16, the bias control circuit 87 (see FIG. 12) outputs a command voltage to the air pressure control circuit 131, and then the control circuit 131 transmits a control signal to the pulse drive circuit 32.

Figure 11:
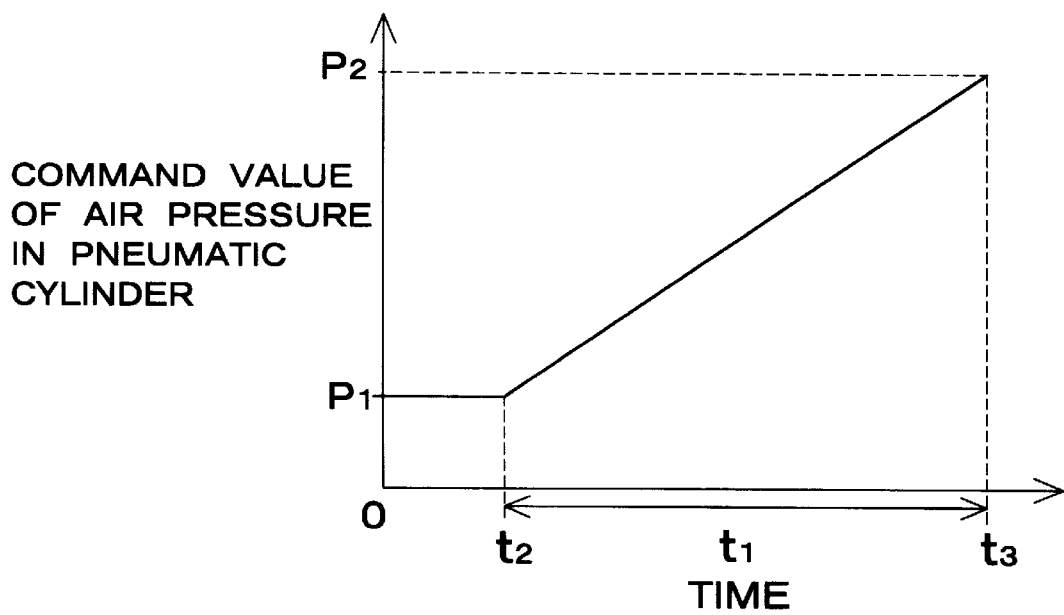
FIG. 11 is a graph of showing input signals in a ramp-up processing on air pressure values in the second embodiment.

For example, as shown in FIG. 11, the air pressure to be supplied to the pneumatic cylinder 41 is controlled so that the air pressure value in the cylinder 41 becomes a bias value $P_1$. At this time, the current air pressure value in the cylinder 41 is detected by the air pressure sensor 70 (see FIG. 9). The reason of continuing to transmit a command of the bias value $P_1$ until the time $t_2$ elapses is because the time for filling air pressure in the pneumatic cylinder 41 is needed.

In the vacuum proportional O/C valve 16 in a closed state, when the vacuum pressure in the reaction chamber 10 is lower than atmospheric pressure, the suction force acts on the poppet valve 45 of the valve 16 in the direction of the reaction chamber 10. The degree of the suction force is dependent on the degree of the vacuum pressure in the reaction chamber 10. Thus, the optimum bias value varies with the degree of the vacuum pressure in the reaction chamber 10. In the second embodiment, the correspondences between the bias value $P_1$ and the degree of the vacuum pressure in the reaction chamber 10 are stored in advance as data in the controller 20.

Returning to FIG. 8, in S12A, when the air pressure in the pneumatic cylinder 41 reaches the bias value $P_1$ stored in advance, the flow advances to S12B where a ramp-up processing is conducted on the air pressure. For example, the air pressure control circuit 131 transmits a control signal to the pulse drive 32 (see FIG. 9) so that the air pressure in the cylinder 41 is changed from the bias value $P_1$ to a value $P_2$ before the time $t_3$ elapses as shown in FIG. 11.

Figure 10:
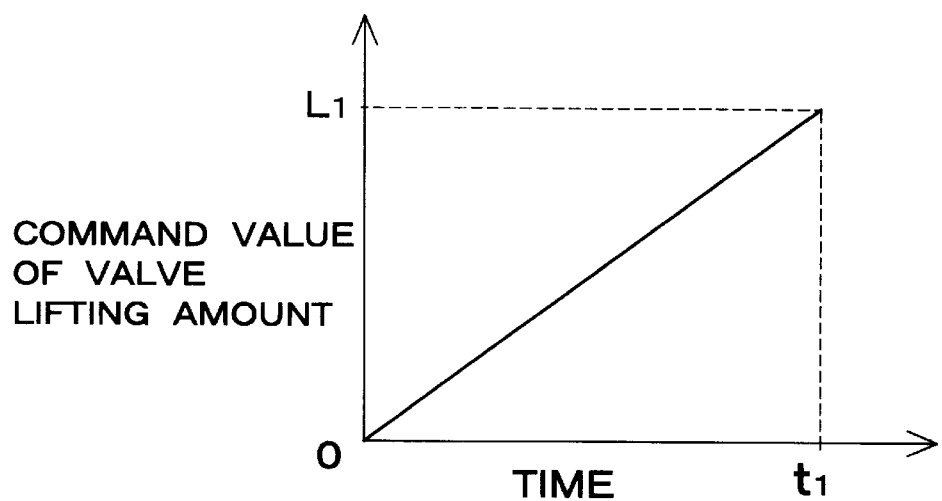
FIG. 10 is a graph of showing input signals in a ramp-up processing on valve lifting amounts in the first embodiment.

It is to be noted that the relation between the graph of FIG. 11 and the graph of FIG. 10 in the first embodiment means that, assuming that the valve lifting amount $L_1$ of the valve 16 is 0.1266 mm at the time when the air pressure value in the cylinder 41 is $P_2$ the filling of the air pressure $(P_1 \rightarrow P_2)$ for providing the valve lifting amount of 0.1266 mm is conducted at expense in 10 sec.

In S13, it is judged as to whether the duration from the time $t_2$ to $t_3$ has elapsed. In FIG. 8, when the air pressure in the pneumatic cylinder 41 is at $P_2$, the valve lifting amount $L_1$ of the valve 16 is 0.1266 mm and the duration between the time $t_2$ and $t_3$ is 10 sec. $(t_1)$. After that, the same processing is conducted as in the first embodiment. Specifically, S13–S18 in FIG. 8 correspond to S3–S8 in FIG. 2 in the first embodiment.

Furthermore, in the vacuum pressure control system in the second embodiment, the same execution processing (see FIG. 1) as in the first embodiment is carried out upon completion of the preparation processing in the SVAC mode.

As described above, in the vacuum pressure control system in the first and second embodiment, the vacuum pressure value in the reaction chamber 10 of a CVD system disposed on a semiconductor manufacturing line is measured by the vacuum pressure sensors 14 and 15 (S22), and the difference between the measured value and the desired vacuum pressure value commanded from the exterior by the on-site input on the front panel of the controller 20 or the remote input from the central control device 80 is calculated. Based on the calculated difference, the controller 20 generates an external command. In accordance with the external command, the air pressure control section 30 controls the opening degree of the vacuum proportional O/C valve 16, thereby changing the conductance of the exhaust system from the reaction chamber 10 to the vacuum pump 13. In this manner, performed is the feedback control for fixedly maintaining the vacuum pressure in the reaction chamber 10 from which gas is exhausted by the vacuum pump 13 at the desired vacuum pressure value in a range from atmospheric pressure to high vacuum pressure (S27).

In the execution processing, the controller 20 generates internal commands in sequence (S26). The internal command represents a vacuum pressure value obtained by changing the chamber vacuum pressure measured by the vacuum sensors 14 and 15 at the set vacuum pressure changing speed acquired in S24. With the internal commands sequentially generated, the desired value of the feedback control is changed in sequence (S26). The feedback control is thus executed as the follow-up control (S27). Consequently, the vacuum pressure in the reaction chamber 10 can be uniformly changed at the set vacuum pressure changing speed.

Specifically, in the vacuum pressure control system in the above embodiments, the opening degree of the vacuum proportional O/C valve 16 is controlled to uniformly change the vacuum pressure in the reaction chamber 10 at the set vacuum pressure changing speed commanded from the exterior by the remote input or the on-site input or determined and stored in advance in the controller 20. Accordingly, if a small value of the set vacuum pressure changing speed is given from the exterior, the process of exhausting gas from the reaction chamber 10 can be slowly proceeded at a small quantity of gas mass-flow, thus enabling the reduction in velocity of the gas flow in the vacuum vessel. This makes it possible to prevent particles from flying up in the reaction chamber 10.

The vacuum pressure in the reaction chamber 10 can be uniformly changed at the set vacuum pressure changing speed given from the exterior or determined and stored in advance in the controller 20 until the vacuum pressure in the reaction chamber 10 reaches the desired pressure. Unlike the vacuum pressure changing speed in the prior art which is reduced in the bypass valve 17, the vacuum pressure changing speed in the reaction chamber 10 will not become slow inverse-functionally. Thus, the time needed for controlling the vacuum pressure in the reaction chamber 10 to the desired vacuum pressure value can be shortened. This will contribute to the shortening for the batch processing time in the reaction chamber 10 disposed in the semiconductor manufacturing line.

Figure 13:
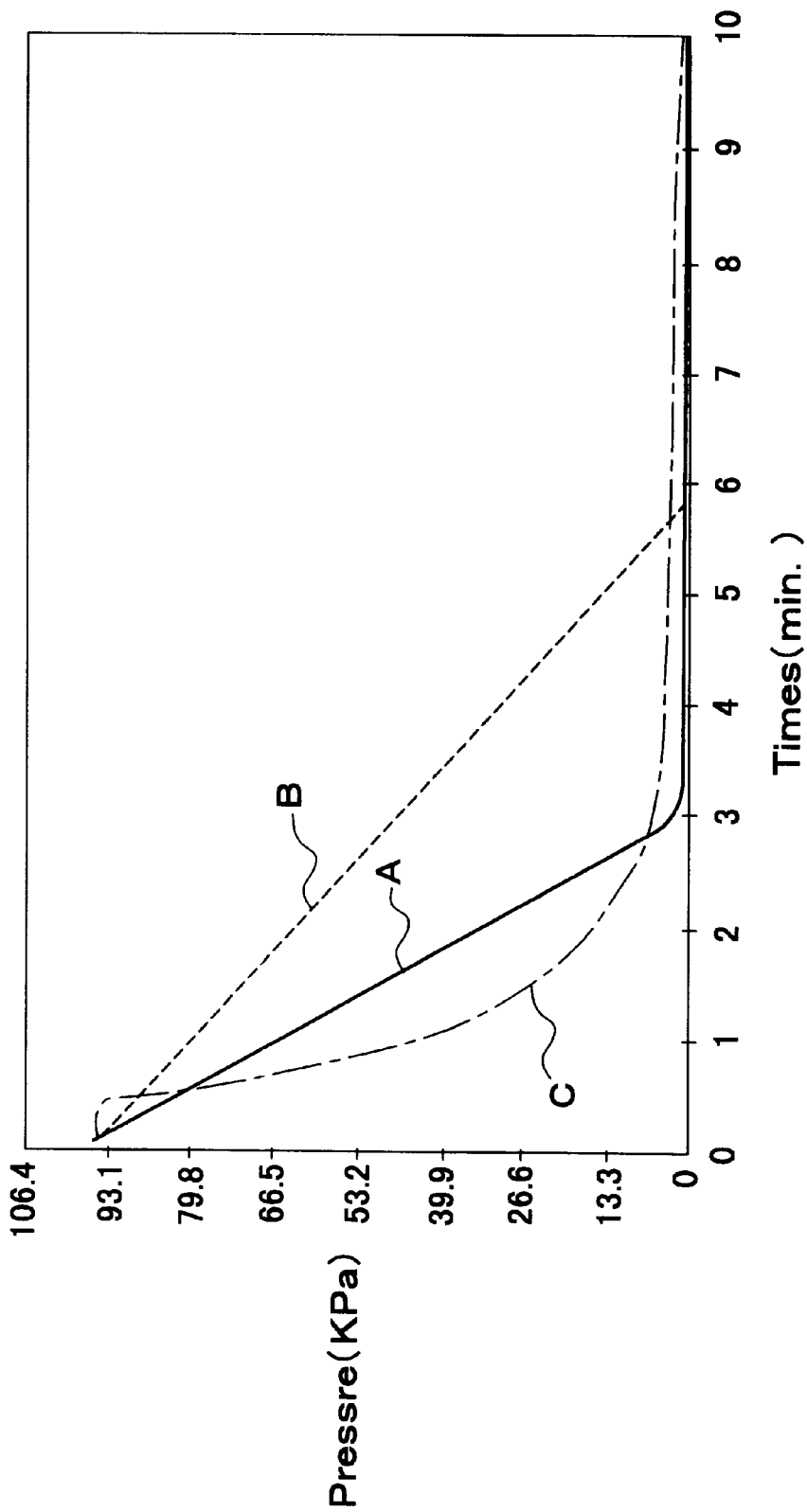
FIG. 13 is a graph of showing effects obtained with the vacuum pressure control system in the embodiments.
Figure 14:
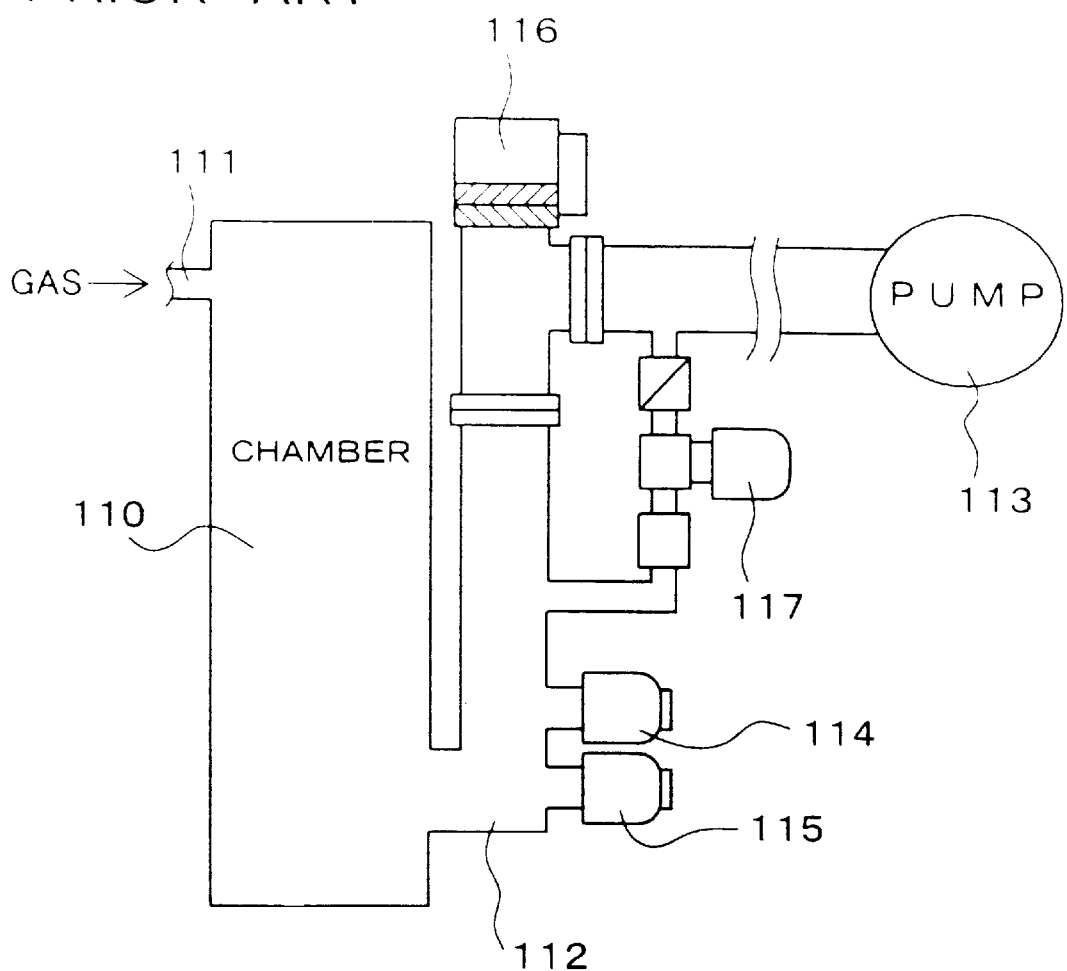
FIG. 14 is a schematic constructive view of a CVD system and its exhaust system in a prior art.

FIG. 13 is a graph of showing the variations of the vacuum pressure in the reaction chamber 10 in the gas exhaust control executed through the bypass valve 17 in the prior art (line C) and through the vacuum proportional O/C valve 16 in the above embodiments (lines A and B), respectively, for changing the vacuum pressure in the reaction chamber 10 to 0 Pa which is a desired vacuum pressure value. With the vacuum proportional O/C valve 16, in either case of the set vacuum pressure changing speeds of 665 Pa/sec. (line A) and 332.5 Pa/sec. (line B), as is evident from the graph, the vacuum pressure in the reaction chamber 10 could be uniformly changed at the set vacuum pressure changing speed. On the other hand, in the case of the bypass valve 17 in the prior art, the vacuum pressure changing speed in the reaction chamber 10 became slow inverse-functionally (line C). From those results, in the vacuum pressure control system in the present embodiment, the time needed for controlling the vacuum pressure in the reaction chamber 10 to the desired value (0 Pa) can be shortened.

In the vacuum pressure control system in the above embodiments, the feedback control for manipulating the opening of the vacuum proportional O/C valve 16 is executed as follow-up control (S26, S27) so that the vacuum pressure in the reaction chamber 10 is uniformly changed at the set vacuum pressure changing speed given from the exterior or determined and stored in advance in the controller 20, needing no bypass valve 17 in the prior art. Accordingly, due to the removal of the bypass valve 17, the vacuum pressure control system can achieve the reduction in size of a semiconductor manufacturing device.

Since the vacuum pressure in the reaction chamber 10 can be uniformly changed at the set vacuum pressure changing speed commanded from the exterior or stored in advance in the controller 20, the process of exhausting gas from the reaction chamber 10 can be proceeded at a desired proceeding rate. Accordingly, unlike the case of using the bypass valve 17, the proceeding rate of the process of gas exhaust from the reaction chamber 10 is not determined based on the size of the fixed orifice.

In the vacuum pressure control system in the above embodiments, even during the execution of the feedback control as the follow-up control, the set vacuum pressure changing speed can be changed through a host control device (e.g., the central control device 80) which controls the semiconductor manufacturing line. Therefore, considering the conditions of the whole semiconductor manufacturing process, the system can respond to the request for proceeding the process of exhausting gas from the reaction chamber 10 at the desired proceeding rate.

The vacuum pressure control system in the above embodiments is provided with the pneumatic cylinder 41 serving as an actuation source of the vacuum proportional O/C valve 16. Prior to the start of the feedback control, in particular, up to the instant preceding the actuation of the pneumatic cylinder 41, the cylinder 41 is pressurized in advance (S2, S8) to remove the dead zone characteristic of the valve 16. Therefore, no response delay occurs when the vacuum pressure in the reaction chamber 10 is uniformly changed at the set vacuum pressure changing speed given from the exterior or stored in advance in the controller 20.

It is to be noted that the degree of pressure to be exerted in advance on the pneumatic cylinder 41 is delicately different in accordance with different conditions due to factors such as displacements of a mechanical zero point of the vacuum proportional O/C valve 16, differences in pressure between the vacuum chamber 10 and the vacuum pump 13, etc. Therefore, the dead zone characteristic of the vacuum proportional valve 16 is surely eliminated by the execution of the constant value control for a predetermined time (S6–S8, S16–S18) immediately after a predetermined pressure is exerted in advance on the pneumatic cylinder 41. Such the constant value control is conducted setting the value which has been slightly changed (by subtracting 266 Pa) from the pressure value in the vacuum chamber 10 as a desired value of the feedback control. In this manner, the occurrence of response delay can be avoid when the vacuum pressure in the vacuum chamber 10 is uniformly changed at the predetermined vacuum pressure changing speed commanded from the exterior or determined and stored in the controller 20. Consequently, it is possible to optimize the initial state where the process of exhausting gas from the vacuum chamber 10 is slowly proceeded.

The present invention may be embodied in other specific forms without departing from the spirit or essential characteristics thereof.

For instance, although the SVAC mode in the vacuum pressure control system in the above embodiments is shifted from the CLOSE mode, it may be shifted from the PRESS mode. However, in this case, the preparation time of the SVAC mode starts from S6 (FIG. 2) or S16 (FIG. 8).

Furthermore, the vacuum pressure control system in the above embodiment can be applied to a vacuum vessel in a semiconductor manufacturing line besides the reaction chamber 10 of the CVD system.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vacuum pressure control system including:

a vacuum pressure proportional opening and closing valve which is disposed on a pipe connecting a vacuum vessel to a vacuum pump and changes its opening degree to regulate vacuum pressure in the vacuum vessel; and a vacuum pressure sensor for measuring the vacuum pressure in the vacuum vessel;

the system controlling the opening degree of the vacuum pressure proportional opening and closing valve based on a measured vacuum pressure value output from the vacuum pressure sensor;

wherein the vacuum proportional opening and closing valve is controlled to open from a closed state at a predetermined minute opening degree to allow a small quantity of gas mass-flow to be exhausted from the vacuum vessel so that velocity of gas flow in the vacuum vessel is reduced to prevent particles from flying up in the vacuum vessel.

2. A vacuum pressure control system for executing feedback control on vacuum pressure in a vacuum vessel in a range from atmospheric pressure to high vacuum pressure, the system including:

a vacuum vessel disposed on a semiconductor manufacturing line;

a vacuum pump for exhausting gas from the vacuum vessel;

a vacuum proportional opening and closing valve which is disposed on a pipe connecting the vacuum vessel to the vacuum pump and changes its opening degree to regulate vacuum pressure in the vacuum vessel, the valve including a poppet valve configuration;

a vacuum pressure sensor for measuring the vacuum pressure in the vacuum vessel;

a controller which generates an external command based on a difference between the vacuum pressure value output from the vacuum pressure sensor and a desired vacuum pressure value given from an exterior; and an air pressure control part which manipulates the opening degree of the vacuum proportional opening and closing valve in accordance with the external command;

wherein a vacuum pressure value calculated based on a set vacuum pressure changing speed given from the exterior or determined and stored in advance in the controller is sequentially generated in the controller as an internal command, while a desired value of the feedback control is changed in sequence by the internal command to execute the feedback control as follow-up control, and the vacuum pressure in the vacuum vessel is changed at the set vacuum pressure changing speed so that a process of exhausting gas from the vacuum vessel can be slowly proceeded.

3. The vacuum pressure control system according to claim 2, wherein the set vacuum pressure changing speed is changeable by means of a host control device which controls the semiconductor manufacturing line even during execution of the feedback control as the follow-up control.

4. The vacuum pressure control system according to claim 2 further including a pneumatic cylinder which serves as an actuation source of the vacuum proportional opening and closing valve, the pneumatic cylinder being pressurized in advance of a start of the feedback control in order to remove a dead zone characteristic of the vacuum proportional opening and closing valve.

5. The vacuum pressure control system according to claim 4 further including a potentiometer for measuring positions of a piston rod of the pneumatic cylinder, the pneumatic cylinder being pressurized in advance based on measured results of the potentiometer.

6. The vacuum pressure control system according to claim 4 further including an air pressure sensor for measuring air pressure in the pneumatic cylinder, the pneumatic cylinder being pressurized in advance based on measured results of the air pressure sensor.

7. The vacuum pressure control system according to claim 6, wherein the pneumatic cylinder is pressurized in advance up to an instant preceding actuation.

8. The vacuum pressure control system according to claim 5, wherein a constant value control setting a value which is slightly changed from the vacuum pressure value in the vacuum vessel as a desired value of the feedback control is executed for a predetermined time immediately after the previous pressurization on the pneumatic cylinder so that the dead zone characteristic of the vacuum proportional opening and closing valve is surely removed.

* * * * *